US011153442B1

(12) United States Patent
Balyasny et al.

(10) Patent No.: US 11,153,442 B1
(45) Date of Patent: Oct. 19, 2021

(54) SYSTEMS AND METHODS FOR FACILITATING SIDE-CHANNEL COMMUNICATIONS DURING SHARED COMMUNICATION SESSION

(71) Applicant: BANDE FITNESS LLC, Wilson, WY (US)

(72) Inventors: Rebecca Balyasny, Wilson, WY (US); Dmitry Rakovitsky, Marlboro, NJ (US); Amaya Weddle, San Luis Obispo, CA (US); Sergei Selin, Lafayette, CO (US)

(73) Assignee: BANDE FITNESS LLC, Wilson, WY (US)

( * ) Notice: Subject to any disclaimer, the term of this patent is extended or adjusted under 35 U.S.C. 154(b) by 0 days.

(21) Appl. No.: 17/160,695

(22) Filed: Jan. 28, 2021

(51) Int. Cl.
*H04M 3/56* (2006.01)
*H04L 29/06* (2006.01)

(52) U.S. Cl.
CPC .......... *H04M 3/564* (2013.01); *H04L 65/403* (2013.01); *H04L 65/4007* (2013.01)

(58) Field of Classification Search
CPC .............. H04L 65/403; H04L 65/4007; H04M 3/56–569
USPC ................. 370/259–271; 379/202.01–207.01
See application file for complete search history.

(56) References Cited

U.S. PATENT DOCUMENTS

| | | | | |
|---|---|---|---|---|
| 6,404,873 B1 * | 6/2002 | Beyda | ................. | H04L 12/1813 379/202.01 |
| 6,747,970 B1 * | 6/2004 | Lamb | .................. | H04L 12/6418 370/352 |
| 7,058,168 B1 * | 6/2006 | Knappe | ............... | H04L 12/1822 370/260 |
| 7,127,487 B1 * | 10/2006 | Wang | .................. | H04L 12/1822 709/204 |
| 7,653,013 B1 * | 1/2010 | Moran | ................ | H04L 12/1822 370/261 |
| 8,150,450 B1 * | 4/2012 | Wengrovitz | .......... | H04L 65/403 455/550.1 |
| 2004/0008635 A1 * | 1/2004 | Nelson | .................... | H04N 7/152 370/260 |
| 2005/0078613 A1 * | 4/2005 | Covell | .............. | H04L 29/06027 370/260 |
| 2005/0122389 A1 * | 6/2005 | Miao | ....................... | H04N 7/152 348/14.01 |
| 2005/0276405 A1 * | 12/2005 | Fernandes | ............... | H04M 3/56 379/202.01 |
| 2006/0164508 A1 * | 7/2006 | Eshkoli | .................. | H04N 7/148 348/14.09 |

(Continued)

*Primary Examiner* — Hemant S Patel
(74) *Attorney, Agent, or Firm* — Marshall, Gerstein & Borun LLP

(57) ABSTRACT

Systems and methods for providing side-channel communications to supplement a shared communication channel are provided. Participant devices within a side-channel communication group are configured to receive a first audio stream associated with the shared communication channel and a second audio stream associated with the side-channel communication group. A host platform or a participant device may mix the first and second audio streams to produce a composite output audio stream that enables users to listen to both audio shared to shared communication channel and audio generated by other members of the side-channel communication group.

17 Claims, 8 Drawing Sheets

(56) References Cited

U.S. PATENT DOCUMENTS

| | | | |
|---|---|---|---|
| 2008/0159509 A1* | 7/2008 | Whitfield | H04M 3/2281 379/202.01 |
| 2008/0267095 A1* | 10/2008 | Sekaran | H04L 12/66 370/260 |
| 2010/0198648 A1* | 8/2010 | Bank | G06Q 10/06311 705/7.19 |
| 2010/0246571 A1* | 9/2010 | Geppert | G06F 3/0486 370/352 |
| 2011/0154204 A1* | 6/2011 | Narayanaswamy | H04L 12/1818 715/727 |
| 2011/0261940 A1* | 10/2011 | Burt | H04M 3/56 379/158 |
| 2012/0128146 A1* | 5/2012 | Boss | H04M 3/56 379/202.01 |
| 2014/0267550 A1* | 9/2014 | Nimri | H04N 7/152 348/14.03 |
| 2014/0369491 A1* | 12/2014 | Kloberdans | H04M 3/564 379/421 |
| 2015/0244981 A1* | 8/2015 | Johnson | G06F 3/048 348/14.07 |
| 2016/0065895 A1* | 3/2016 | Chen | H04S 7/40 348/14.08 |
| 2017/0093944 A1* | 3/2017 | Hockett | H04L 12/1818 |

\* cited by examiner

SYSTEMS AND METHODS FOR FACILITATING SIDE-CHANNEL COMMUNICATIONS DURING SHARED COMMUNICATION SESSION

FIELD OF THE DISCLOSURE

The present application relates generally to facilitating side-channel communications during a shared communication session and, more particularly, to mixing audio streams of the side-channel and the shared communication session to generate a composite audio output stream.

BACKGROUND

Online classes are typically support via a shared video conference experience. A host sets up a shared communication channel (e.g., a video conference call) for participants to join. The host may present live streamed content (e.g., a live training class or lecture) or previously recorded content (e.g., a past training class or lecture). The participants of the shared communication channel can then view the content presented by the host.

Often, participants in a shared communication channel know one another. If the class was presented offline, participants that know each other tend to group so that they can quietly communicate with one another without disturbing the other participants in the class or lecture. However, this ability to engage in private conversations during a class is not provided by video conference technology. Conventionally, participants must establish a separate video conference (e.g., via a break out room or creating a new video conference) or speak to the entire class. Neither conventional solution adequately replicates the ability to quietly converse with other participants similar to offline classes.

Therefore, there is a need for systems and method of facilitating side-channel communications during a shared communication session.

SUMMARY

In one embodiment, a system for providing side-channel communications to supplement a shared communication channel is provided. The system includes (i) one more processors; (ii) one or more transceivers configured to receive a plurality of audio streams from a plurality of audio sources, wherein the plurality of audio sources include a host audio source and a plurality of participant audio sources corresponding to a plurality of participant devices; and (iii) one or more non-transitory memories configured to store (a) an indication that two or more participant devices of the plurality of participant devices are members of a side-channel communication group, and (b) computer executable instructions that, when executed via the one or more processors, cause the system to (1) for each participant device that is a member of the side-channel communication group, (a) generate a side-channel audio stream by combining the audio streams received from other members of the side-channel communication group, (b) generate an output audio stream by combining the side-channel audio stream with the audio stream from the host audio source, and (c) transmit, to the participant device of the member of the side-channel communication group and via the one or more transceivers, the output audio stream; and (2) for participant devices that are not members of the side-channel communication group, transmit, to the participant device and via the one or more transceivers, the host audio stream.

In another embodiment, a method for participating in side-channel communications to supplement a shared communication channel is provided. The method includes (1) joining, by one or more processors, the shared communication channel; (2) forming, by the one or more processors, a side-channel communication group with at least one other participant device of the shared communication channel; (3) receiving, from a server, a host audio stream generated by a host device of the shared communication channel; (4) receiving, from the server, a side-channel audio stream that includes audio data generated by the at least one other participant device included in the formed side-channel communication group; and (5) outputting, by the one or more processors, a composite audio stream formed from the host audio stream and the side-channel audio stream.

In yet another embodiment, a non-transitory computer readable medium is provided. The computer-readable medium stores computer-executable instructions that, when executed by one or more processors, cause the one or more processors to (1) join a shared communication channel; (2) form a side-channel communication group with at least one other participant device of the shared communication channel; (3) receive, from a server, a host audio stream generated by a host device of the shared communication channel; (4) receive, from the server, a side-channel audio stream that includes audio data generated by the at least one other participant device included in the formed side-channel communication group; and (5) output a composite audio stream formed from the host audio stream and the side-channel audio stream.

BRIEF DESCRIPTION OF THE DRAWINGS

The Figures described below depict various aspects of the system and methods disclosed herein. Each figure depicts a particular aspect of the disclosed system and methods, and each of the figures is intended to accord with a possible aspect thereof. Further, wherever possible, the following description refers to the reference numerals included in the following figures, in which features depicted in multiple figures are designated with consistent reference numerals.

There are shown in the Figures arrangements which are presently discussed, it being understood, however, that the present embodiments are not limited to the precise arrangements and instrumentalities shown, wherein.

Figure 1A:
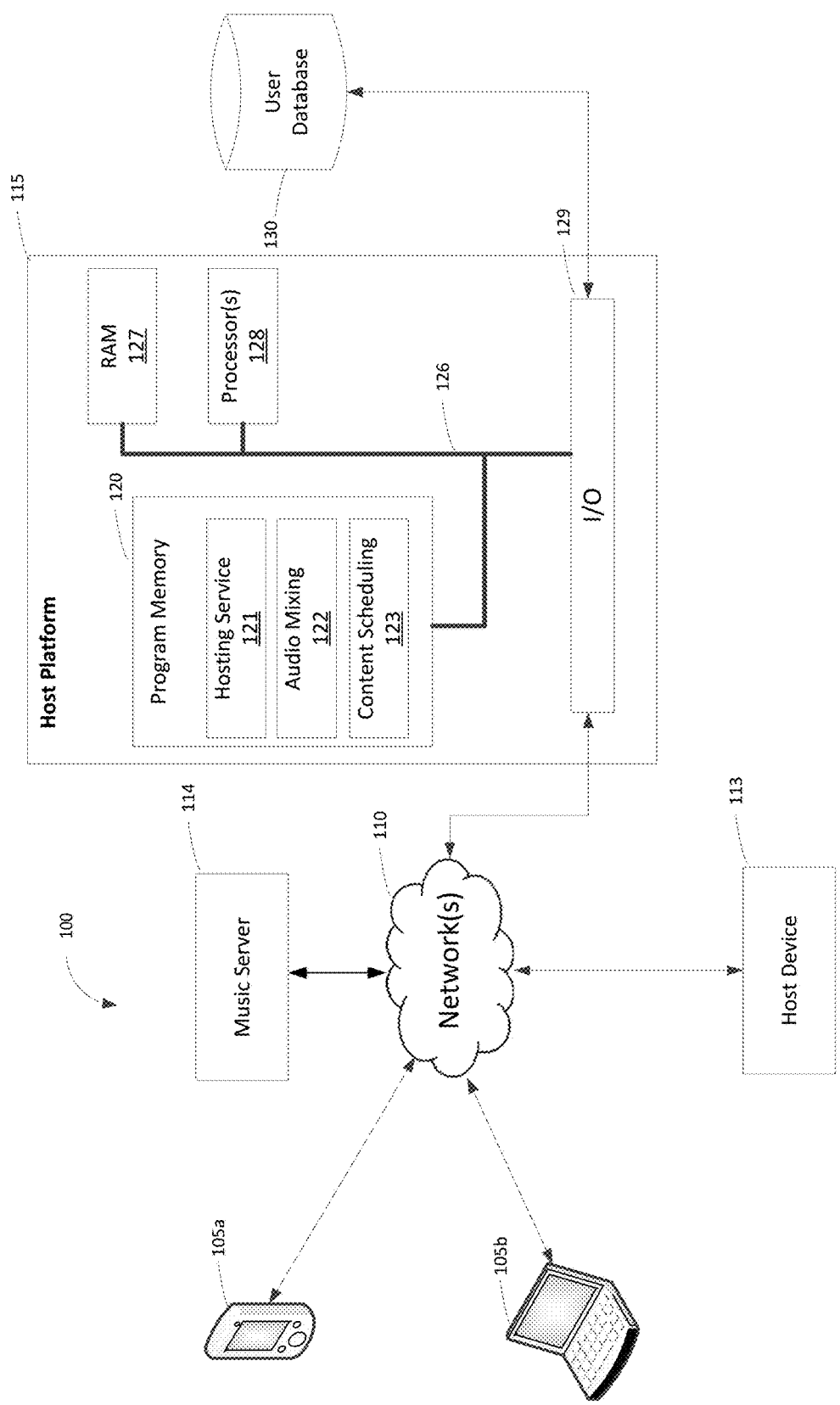
FIGS. 1A and 1B are a block diagram of an example environment that includes a host platform configured to facilitate the side-channel communication techniques described herein.

The Figures depict preferred embodiments for purposes of illustration only. Alternative embodiments of the systems and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Embodiments of the present disclosure include a host platform that supports shared communication channels between a host device and a plurality of participant devices. As it is used herein, a "shared communication channel" is a communication channel in which each participant device is configured to contemporaneously receive content provided by a host device. Typically, the content is video content associated with a video stream and an audio stream. However, these techniques may also be applied to visual and audio streams of shared augmented or virtual reality content.

The present disclosure generally refers to the content of the shared communication channel as being associated with a fitness and/or wellness platform. For example, the shared communication channel may be a live fitness class hosted by a trainer device. As another example, the shared communication channel may be a pre-recorded fitness class hosted by the host platform itself. That said, the present disclosure may be applied to many different types of content, such as lectures, presentations, live-streamed gaming, sporting, or other types of live performances and/or events, or other types of content associated with a plurality of participants viewing shared content presented by a host device. For many types of content, individual participants are generally muted and/or cannot readily communicate with particular our participants by speech via the platform hosting the presented content.

As it is used here, a "side-channel communication group" refers to an audio channel established between two or more participants of the shared communication channel. It should be appreciated that participation in the shared communication channel may cause a video stream from each participant device to be routed to the other participant devices of the shared communication channel. However, due to the large number of participants in the shared communication channel, the audio stream associated with the video stream shared to the other participants is typically muted. Accordingly, the side-channel communication group establishes an additional audio stream that is routed to the participant devices of the side-channel communication group. This additional audio stream is not routed to the other participant devices of the shared communication channel that are not included in the side-channel communication group. As a result, the participant devices of the side-channel communication group receive audio and video streams of content presented by the host to the shared communication channel and an additional audio stream corresponding to the side-channel communication group.

Receiving two audio streams at a participant device presents technical challenges on how to prioritize the audio streams to ensure that each participant in a side-channel communication group is still able to meaningfully understand the content of the shared communication channel. Accordingly, embodiments disclosed herein relate to audio mixing techniques that mix the shared communication channel audio stream and the side-channel communication group audio stream to generate a composite audio stream presented to participant. The audio mixer may be implemented centrally at the host platform and/or at the individual participant devices. In some embodiments, the audio mixer is configured to produce a composite audio stream where a volume level of the shared communication channel audio stream is higher than a volume level of the side-channel communication group audio stream volume level. As it is used herein, volume level does not refer to an instantaneous magnitude of the audio stream, but an amount of gain applied to the audio stream. Generally, gains between 0 and 1 decrease the volume level of an audio stream within the composite audio stream and gains over 1 increase the volume level of an audio stream within the composite audio stream.

In some embodiments, the audio mixer dynamically adjusts the volume levels of the shared communication channel audio stream and the side-channel communication group audio stream. As one example, in the context of a fitness class, the host trainer may instruct the participants to engage in a first exercise and not speak again until instructing the participants to engage in a second exercise. In this interim period, the audio mixer may detect that a magnitude of the audio stream from the host device is below a threshold magnitude and increase the volume level of side-channel communication group audio streams. Similarly, when the instructor the provides the second instruction to the participants, the audio mixer may detect that the magnitude of the audio stream from the host device is above a threshold magnitude and reset the volume level of the side-channel communication group audio streams to a default level. To measure the magnitude of the audio stream from the host device, the audio mixer may calculate a rolling average of magnitudes for a prior time period (e.g., 250 msec, 500 msec, 1 sec, etc.).

To provide a smooth audio experience, the audio mixer may detect that the magnitude of the audio stream from the host is below the threshold magnitude for a threshold duration before adjusting the volume level of the side-channel communication group audio stream. It should be appreciated that this duration may vary depending on the type of content presented by the host device. For example, the gaps between instructor commentary may be shorter for a high-intensity interval training (HIIT) class than a meditation class. Accordingly, the threshold duration may be shorter for the HIIT class than the meditation class. As another way to smooth out the dynamic volume shifts, the audio mixer may gradually increase volume of the side-channel communication group audio stream up to a maximum volume level. Similar to the threshold duration, the rate of increase may vary depending on the type of content presented by the host device.

In some embodiments, the host is able to control when the side-channel communication groups are enabled. For example, the content presented by the host device may include a break period, an open discussion period, a Q&A period, and so on. Unlike the other periods of the content presented by the host device, participant participation is encouraged during these periods. Accordingly, when the host disables the side-channel communication groups, the audio streams generated by a participant device are routed to the shared communication channel, not the side-channel communication group. Similarly, when the host re-enables the side-channel communication groups, the audio streams generated by a participant device included in a side-channel communication group are again routed to the side-channel communication group, and not the shared communication channel.

In some embodiments, a user interface presented to the host includes interface elements that enable manual control over enabling/disabling the side-channel communication groups. Additionally or alternatively, some types of content may include a schedule that includes indications when to enable or disable side-channel communication groups. For example, a fitness class may schedule the first 45 minutes to active training where side-channel communication groups are enabled, followed by a 5-minute break period side-channel communication groups are disabled, and then another 45 minutes of active training where the side-channel communication groups are enabled again. In this example, the host device may automatically enable or disable the side-channel communication groups in accordance with the schedule. As a result, the host platform is able to control the routing of audio streams of participant devices to improve the participant experience when viewing content presented by the host device.

Figure 1B:
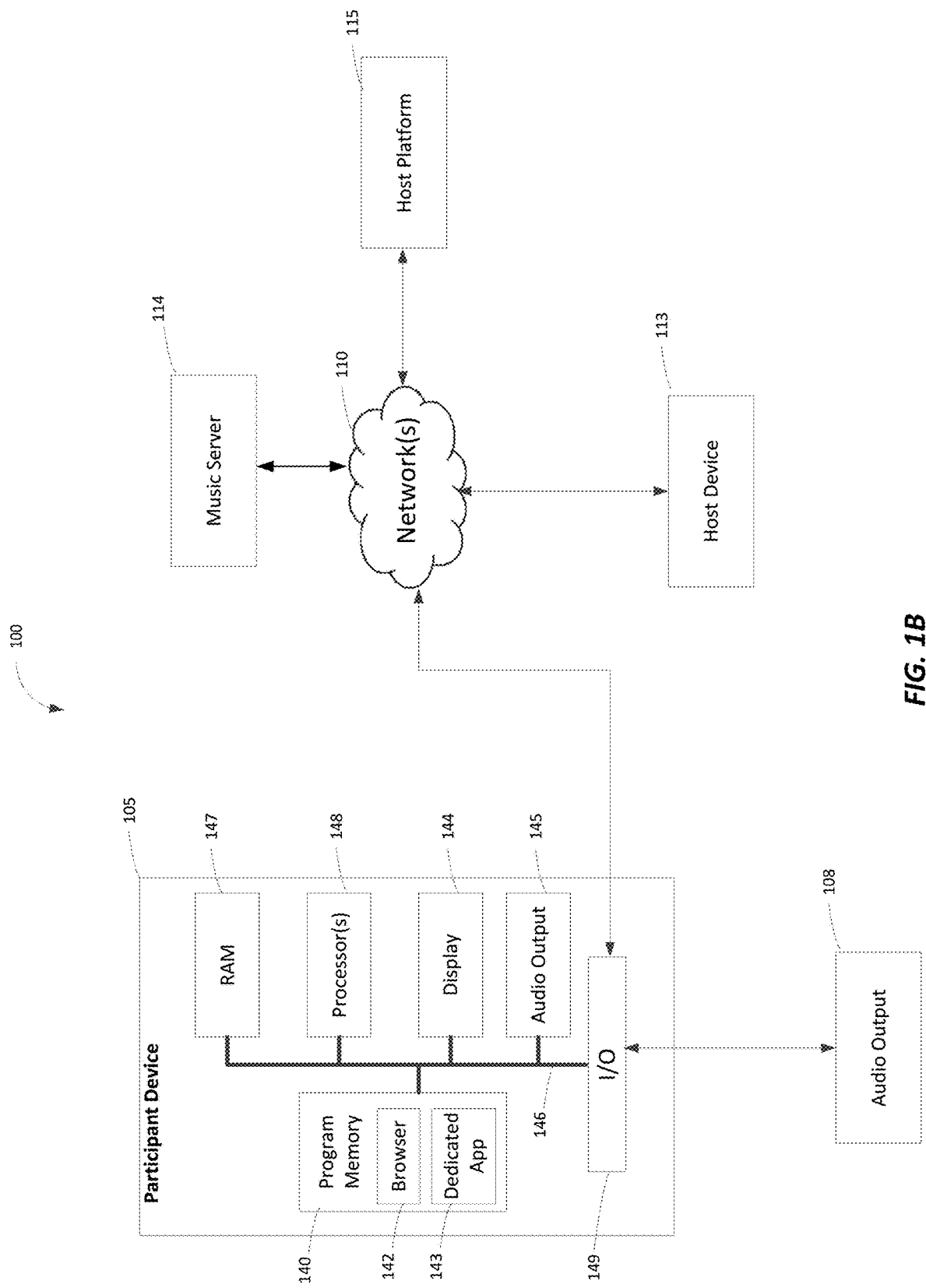

Referring now to FIGS. 1A and 1B, illustrated is an example environment 100 that includes a host platform 115 configured to host shared communication channels. The host platform 115 may be a server or other type of computing platform. In some scenarios, the host platform 115 is operated by a provider of livestreamed and/or pre-recorded content, such as fitness classes or lectures. While FIG. 1A illustrates that host platform 115 as a single entity, in other embodiments, the host platform 115 may be multiple entities acting in conjunction with one another. For example, in some embodiments, the host platform 115 is implemented in a distributed computing environment, such as a cloud computing environment.

To join shared communication channel supported by the host platform 115, the participants interact with a participant device 105, such as mobile phone 105a, laptop computer 105b, a tablet, a smart wearable device (e.g., smart glasses, a smart watch, smart apparel), a home personal assistance device, connected fitness equipment, or any other electronic device that is normally used to access internet-based content. The participant devices 105 are communicatively coupled to the host platform 115 via one or more wired or wireless networks 110 that facilitate any type of data communication via any current or future-developed standard or technology (e.g., GSM, CDMA, TDMA, WCDMA, LTE, EDGE, OFDM, GPRS, EV-DO, New Radio, UWB, IEEE 802 including Ethernet and Wi-Fi, WiMAX, Bluetooth, and others). Although FIG. 1 only illustrates two participant devices 105, the environment 100 may include any number of participant devices 105.

The host platform 115 includes one or more processors 128 configured to execute instructions that form the various applications, modules, and other components of the search platform 115 described herein. In cloud computing embodiments, the processors 128 may be physically located in different hardware entities (e.g., servers) while still being logically connected to execute the various tasks described herein. The processors 128 may include central processing units (CPUs), graphics processing units (GPUs), application-specific integrated circuits (ASICS), and/or any other types of computer processors. While the disclosure may generally refer to the processors 128 executing the various tasks described herein, particular tasks may be better suited to one type of processor. For example, some of the audio mixing techniques disclosed herein may be more efficiently executed by dedicated audio processors or GPUs than CPUs. Accordingly, in embodiments that include multiple types of processors, the host platform 115 may utilize a particular type of processor to execute instructions that are more efficiently executed by the particular type of processor.

In the illustrated embodiment, the host platform 115 also includes a program memory 120, a random-access memory (RAM) 127, and an input/output (I/O) circuit 129, all of which may be interconnected via an address/data bus 126. It should be appreciated the memory of the search platform 115 may include multiple RAMs 127 and multiple program memories 120 implemented as any type of memory, such as semiconductor memory, magnetically readable memory, or optically readable memory, for example. Similarly, although the I/O circuit 129 is shown as a single block, it should be appreciated that the I/O circuit 129 may include a number of different types of I/O circuits. For example, the I/O block 129 may include one or more transceiver circuits to facilitate communications over the networks 110 and/or directly with one or more databases.

The program memory 120 may store any number of applications, routines, tools, or other collections of computer-readable instructions that support the audio mixing techniques described herein. For example, the program memory 120 may include a hosting service 121 configured to establish shared communication channels, an audio mixing application 122 configured to mix the audio streams from a shared communication channel and a side-channel communication group to produce a composite audio stream, and a content scheduling program 123 configured to support scheduling the establishment of shared communication channels (e.g., via the hosting service 121) and/or demarcation of time periods within content presented to the established shared communication channel. Of course, other applications that relate to shared communication channels may be stored at the program memory 120 (e.g., an application configured to support social networking functionality between users of the host platform 115).

As illustrated, the host platform 115 is connected to a user database 130 that stores user profiles corresponding to users of the host platform 115. For example, the user profile may include an indication identifying the particular participant device 105 used by the user to view shared communication channels (e.g., a MAC address, a serial number, a MEID, a UICC, or other unique identifier), a network location (e.g., IP address) at which the participant is accessing the host platform 115, an indication of other users to which the user is connected, an indication of past shared communication channels joined by the user, an indication of future shared communication channels the user wants to join, a user identifier, and/or other data related to user interactions with the host platform 115. As another example, the host platform 115 may be associated with different tiers of service. Accordingly, in some embodiments, the ability to be a member of side-channel communication groups is a premium feature restricted to particular classes of users. In these embodiments, the user profile may include a flag or other indication indicative of whether or not the user has access to participate in side-channel communication groups. The user database 130 may utilize any known database architecture. For example, in some embodiments, the user database 130 is a distributed file system, such as a cloud storage solution.

In addition to the participant devices 105, the host platform 115 may also be connected to a host device 113 via the networks 110. Similar to the participant devices 105, the host device 113 may be s mobile phone, a laptop computer, a tablet, a smart wearable device (e.g., smart glasses, a smart watch, smart apparel), a home personal assistance device, a connected fitness equipment, or any other electronic device that is normally used to access internet-based content. Although FIG. 1A only depicts a single host device 113, the environment 100 may include any number of host devices 113.

As described herein, a host may interact with the host device 113 to initiate a shared communication channel hosted by the host platform 115. For example, an application (e.g., a dedicated application associated with the host platform 115 or a browser viewing data at website supported by the host platform 115) executing on the host device 113 may interface with the hosting server 121 to initiate the shared communication channel. In some embodiments, the interface is an application programming interface (API) corresponding to the hosting service 121. Upon receiving an indication from the host device 113 to initiate the shared communication channel, the host service 121 may establish the shared communication channel to which content from the host device 113 is presented to the shared communication channel. As part of establishing the shared communication channel, the hosting service 121 may assign the shared communication channel an identifier (e.g., a session ID) to be able to distinguish between any concurrently hosted shared communication channels. In some embodiments, the hosting service 121 may assign a channel type (e.g., yoga, HIIT, lecture, etc.) to the shared communication channel.

After the hosting service 121 establishes the shared communication channel, participants may join the shared communication channel via respective participant devices 105. Upon joining the shared communication channel, the participant device 105 may be configured to present a video stream to the shared communication channel to be viewed by other participants of the shared communication channel.

The hosting service 121 may maintain a list of participants and/or participant devices 105 that joined the shared communication channel. For each participant, the host service 121 may query the user database 130 to determine whether any connected users to the participant have also joined the shared communication channel. If there are other connected users to the participant in the shared communication channel, the host service 121 may configure the user interface presented by the corresponding participant device 105 to prioritize the connected users. For example, the host service 121 may pin the video stream from the connected users' participant devices 105 to a particular location in the user interface. As another example, the host service 121 may include a user interface element that presents a list of the participant's connected users currently in the shared communication channel.

As described herein, a first participant device 105 may be configured to send a request to a second participant device 105 corresponding to a connected user to establish a side-channel communication group. In particular, the first participant device 105 may transmit the request to the host platform 115 via the interface of the hosting service 121, which then relays the request to the second participant device 105. In embodiments where participation in side-channel communication groups is restricted to particular classes of users, the hosting service 121 may query the user profile of the second participant maintained at the user database 130 to verify the second participant has sufficient permission to join a side-channel communication group before relaying the request to the second participant. If the second participant does not have sufficient permission, the hosting service 121 may instead send a notification to the first participant device 105 informing the first participant as such.

To establish the side-channel communication group, the hosting service 121 may be configured to create an entry in the record corresponding to the shared communication channel in which the side-channel communication group is to be established. The hosting service 121 may assign the side-channel communication group an identifier (e.g., a group ID) to distinguish between multiple side-channel communication groups formed within the same shared communication channel. Accordingly, the entry may include an indication of the side-channel communication group identifier and a list of the participants that are included in the side-channel communication group (and/or network addresses of participant devices 105 associated therewith). After establishing the side-channel communication group, the hosting service 121 may update the entry as participants join or leave the side-channel communication group. When an audio stream is received from a participant device 105 included the side-channel communication group, the hosting service 121 queries the entry to identify the other participant devices 105 included in the side-channel communication group to which the audio stream should be routed.

To route the audio stream to the other participant device 105, the hosting service 121 may invoke the audio mixer 122 to combine the audio stream with the audio stream of the shared communication channel to produce a composite audio stream. The audio mixer 122 may apply the various audio mixing techniques disclosed herein to produce the composite audio stream. For example, the audio mixer 122 may overlay the audio streams onto one other to produce a composite output audio stream that includes the component audio streams. When overlaying the audio streams, the audio mixer may set various parameters, such as a volume level, to adjust the component audio streams. In some embodiments, the audio mixer 122 may analyze the content type identifier associated with the shared communication channel to set parameters associated with dynamically mixing the audio streams. The hosting service 121 may route the composite output audio stream to the corresponding participant devices included in the side-channel communication group.

As described herein, in some embodiments, the host platform 115 initiates the shared communication channel, not the host device 113. For example, content previously presented to a shared communication channel by a host device 113 may be archived by the hosting platform 115 for subsequent replays. Accordingly, a user may schedule a replay via the content scheduling application 123. When the host platform 115 detects the time is the scheduled replay time, the content scheduling application 123 may automatically initiate the shared communication channel and begin presenting the archived replay to the shared communication channel.

The content scheduling application 123 may also provide the hosting server 121 with a schedule for content presented to the shared communication channel. As part of establishing the shared communication channel, the hosting service 121 may obtain a corresponding schedule from the content scheduling application 123. For pre-recorded content, a user may demarcate periods where side-channel communications are enabled and/or disabled (e.g., identify periods associated with breaks). For livestreamed content, the host may upload a planned schedule to the host platform 115. The schedule may indicate demarcate periods when the host expects that side-channel communications should be enabled/disabled. When detecting a shift into a new period, the hosting service 121 may automatically enable/disable the side-channel communication groups in accordance with the schedule. Additionally or alternatively, to account for any deviations from the schedule, the hosting service 121 may transmit an alert to the host device 113 that enables the host to manually enable/disable side-channel communication groups.

As illustrated, the host platform 115 is also connected to a music server 114 via the networks 110. Many types of content presented to shared communication channels include background music. Due to usage rights restrictions on music, the hosting platform 115 may prevent hosts from directly playing background music in their livestreams. Instead, the host may create or modify the schedule to include a music schedule based on music files available from the music server 114. Accordingly, the hosting service 121 and/or content scheduling application 123 may be configured to transmit schedule information to the music server 114 such that the music server 114 transmits, to the participant devices 105 included in the shared communication channel, an audio stream in accordance with the music schedule. While FIG. 1A illustrates the music server 114 being external to the host platform 115, in some embodiments, the music server 114 may be a component of the host platform 115.

Similar to the host platform 115 and as shown in FIG. 1B, the participant device 105 includes the program memory 140, one or more processors 148, a random-access memory (RAM) 147, a display 144, audio output 145, and an input/output (I/O) circuit 149, all of which may be interconnected via an address/data bus 146. It should be appreciated that the memory of the participant device 105 may include multiple RAMs 147 and multiple program memories 140 implemented as any type of memory, such as semiconductor memory, magnetically readable memory, or optically readable memory, for example. Similarly, although the I/O circuit 149 is shown as a single block, it should be appreciated that the I/O circuit 149 may include a number of different types of I/O circuits. For example, the I/O block 149 may include one or more transceiver circuits to facilitate communications over the networks 110.

In some embodiments, the program memory 140 includes a browser application 142 that enables the participant to access a website associated with the host platform 115. Additionally or alternatively, the program memory 140 includes a dedicated application 143 for interacting with the host platform 115. The dedicated application 143 may be downloaded to the participant device 105 via an application store, downloaded from a website (e.g. via a plugin or the like), or otherwise installed onto the participant device 105. In some embodiments, the dedicated application 143 is a standalone executable application that generates and presents interfaces on the display 144 associated with the hosting platform 115. While the instant disclosure describes various functionality performed by the dedicated application 143, any such description envisions that alternate performance of the functionality by the browser 142.

In some embodiments, the dedicated application 143 includes an audio mixer configured similar to the audio mixer 122 of the host platform 115. For example, the audio mixing application 122 may combine audio streams of each participant of the side-channel communication group into a side-channel audio stream. The hosting service 121 may then route both the side-channel audio stream and the audio stream of the shared communication channel to the participant device 105 for mixing by the audio mixer of the dedicated application 143. As another example, the music server 114 may be configured to transmit the audio stream of music files directly to the participant device 105 of the shared communication channel. Accordingly, the audio mixer of the dedicated application 143 may be configured to mix the music audio stream, the shared communication channel audio stream, and/or the side-channel audio streams into a composite output audio stream.

As illustrated, the participant device is connected to an external audio output device 108 via the I/O 149. For example, the external audio output device may be an external speaker or other electronic device connected via a wired connection (e.g., analog or digital communication wires) or a wireless connection (e.g., Bluetooth, Wi-Fi, etc.). In some embodiments, rather than mixing the shared communication channel audio stream and the side-channel audio stream into a composite stream, the dedicated application 143 may be configured to route the audio streams to different audio outputs. For example, the dedicated application 143 may route the shared communication channel audio stream to the audio output 145 of the participant device 105 and the side-channel audio stream to the external audio output 108, or vice versa. As another example, the dedicated application 143 may route the composite audio stream to audio output 145 and the music audio stream to the external audio output 108, or vice versa.

Figure 2:
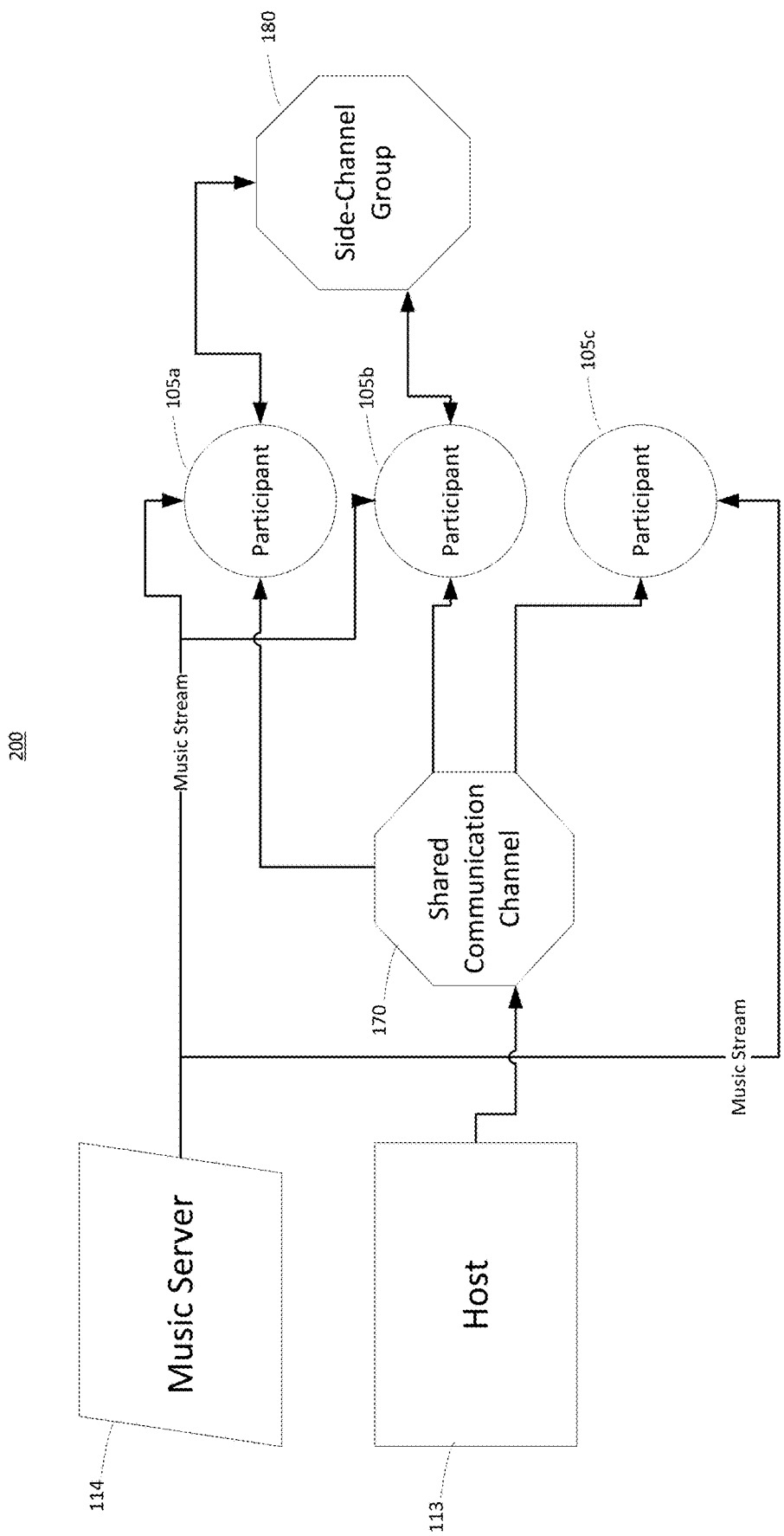
FIG. 2 is a flow diagram illustrating the audio paths for a shared channel and a side-channel, in accordance with the techniques described herein.

With concurrent reference to FIGS. 1A-1B, FIG. 2 depicts a flow diagram 200 illustrating the audio paths for the audio steams associated with a shared communication channel 170 and a side-channel communication group 180. As illustrated, the shared communication channel 170 includes three participant devices 105a, 105b, and 105c. Of course, in other scenarios, the shared communication channel could have any number of additional participant devices. In addition to being participants of the shared communication channel 170, the participant device 105a and the participant device 105b have formed the side-channel communication group 180 that does not include the participant device 105c. In other scenarios, the side-channel communication group 180 may also include additional participant device 105.

As described herein, the host device 113 is configured to present content (e.g., a livestreamed class) to the shared communication channel. It should be appreciated in some alternative embodiments, the host platform 115 is configured to present the content to the shared communication channel 170 exclusive of the host device 113 (e.g., when the host platform 115 is presenting pre-recorded content). Accordingly, any reference to the capability of the host device 113 to configure a shared communication channel and/or present content to the shared communication channel herein envisions an alternate implementation by the host platform 115 itself.

The audio stream generated by host device 113 is routed to the shared communication channel 170. More particularly, the host device 113 transmits the content to the host platform 115 via the networks 110. This transmission may include an identifier of the host device 113 (e.g., a device identifier or an IP address) and/or an identifier of the shared communication channel (e.g., a session ID). In response, the hosting service 121 detects that the identifier(s) and identifies the corresponding shared communication channel hosted at the host platform 115. The hosting service 121 then identifies the participants of the shared communication channel 170 (e.g., the participants 105a, 105b, and 105c) and routes the audio stream to each identified participant via the networks 110.

Additionally, because the participant device 105a and 105b are members of the side-channel communication group 180, the participant devices 105a and 105b also transmit respective audio streams to the host platform 115 via the networks 110. Similar to the audio stream from the host device 113, the participant devices 105a and 105b may include an identifier of the participant device 105 (e.g., a device identifier or an IP address), an identifier of the shared communication channel (e.g., a session ID), and/or an identifier of the side-channel communication group (e.g., a group ID). In response, the hosting service 121 detects that the identifier(s) and identifies the corresponding shared communication channel hosted at the host platform 115. The hosting service 121 then identifies the participants of the side-channel 180 (e.g., the participants 105a and 105b) and routes the audio stream to the identified participants via the networks 110. It should be appreciated that the audio stream generated by a particular participant device 105 may not be routed back to the same participant device 105. That is, in the illustrated scenario, the participant device 105a receives the audio stream generated by participant device 105b and the participant device 105b receives the audio stream generated by the participant device 105a. In scenarios where the side-channel communication group 180 includes three or more participants, the hosting service 121 may combine the participant audio streams such that a side-channel audio stream is created for each side-channel communication group member that excludes their own respective audio stream.

While FIG. 2 illustrates each participant device 105 separately receiving the audio stream from the shared communication channel 170 and their respective side-channel audio stream from the side-channel communication 180, the hosting service 121 may instead route the audio streams to the audio mixer 122 to produce a composite audio stream in accordance with techniques described herein. Accordingly, the hosting service 121 may be configured to transmit respective composite audio streams for each participant of the side-channel communication group 180 via the networks 110.

As illustrated the music server 114 is also configured to route a music audio stream ("music stream") to each participant device 105 that joined the shared communication channel 170. For example, the host device 113 and/or the host platform 115 may have transmitted a music schedule for the shared communication channel 170 to the music server 114. Accordingly, the music server may be configured to transmit the music stream to the participant devices 105 in accordance with the received music schedule. To facilitate proper routing of the music stream by the music server 114, the host platform 115 may transmit to the music server an indication of each participant device 105 within the shared communication channel 170 that corresponds to the music schedule. As participants join or leave the shared communication channel 170, the host platform 115 may update the music server 114 accordingly.

It should be appreciated that while the audio path between the host device 113 and the shared communication channel 170 and the audio path between the participant device 105 and the shared communication channel are illustrated as being unidirectional, these audio paths may become bidirectional when side-channel communication groups are disabled.

Figure 3A:
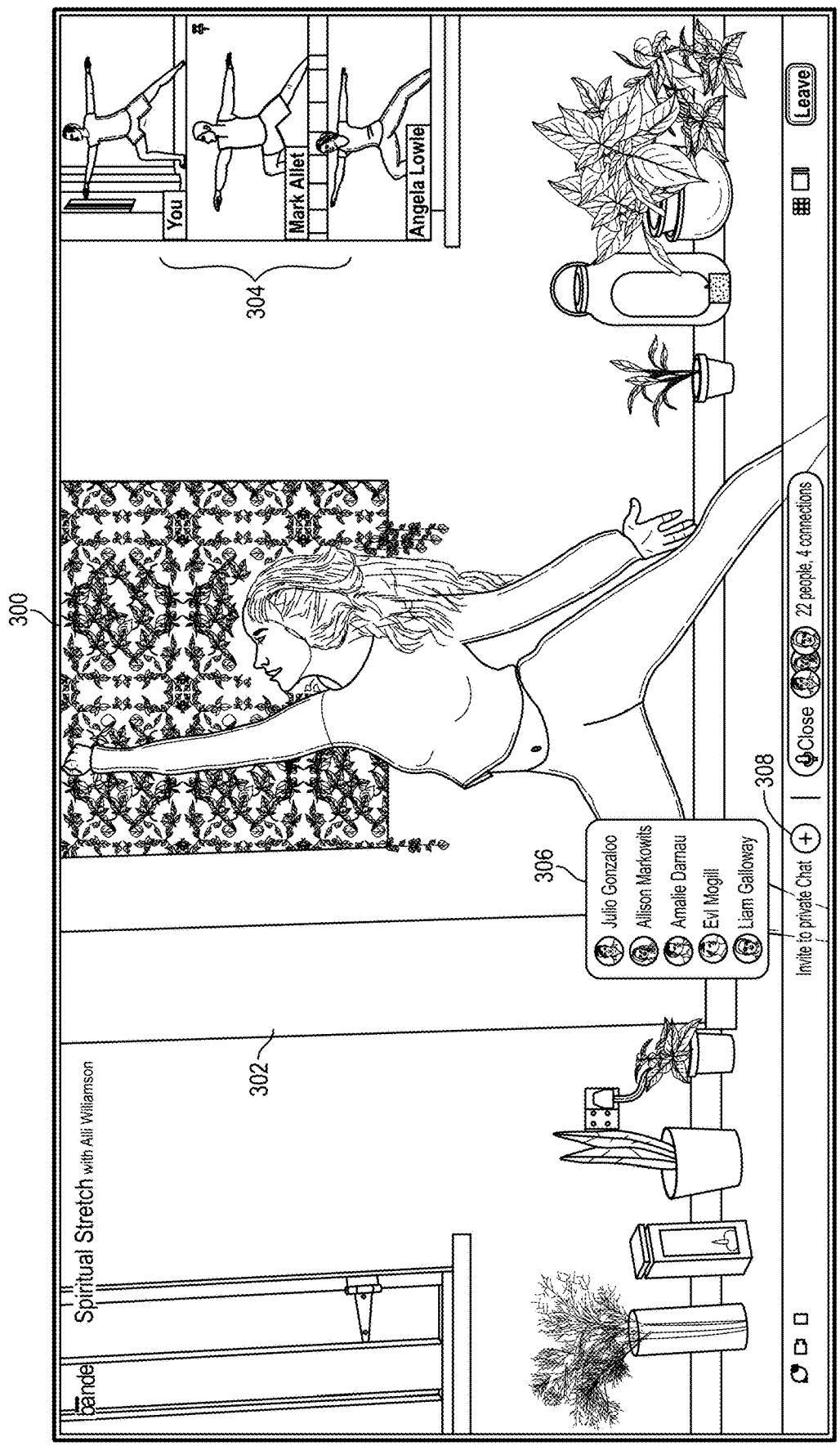
FIG. 3A is an example user interface presented by a participant device to request the formation of a side-channel communication group in accordance with the techniques described herein.
Figure 3B:
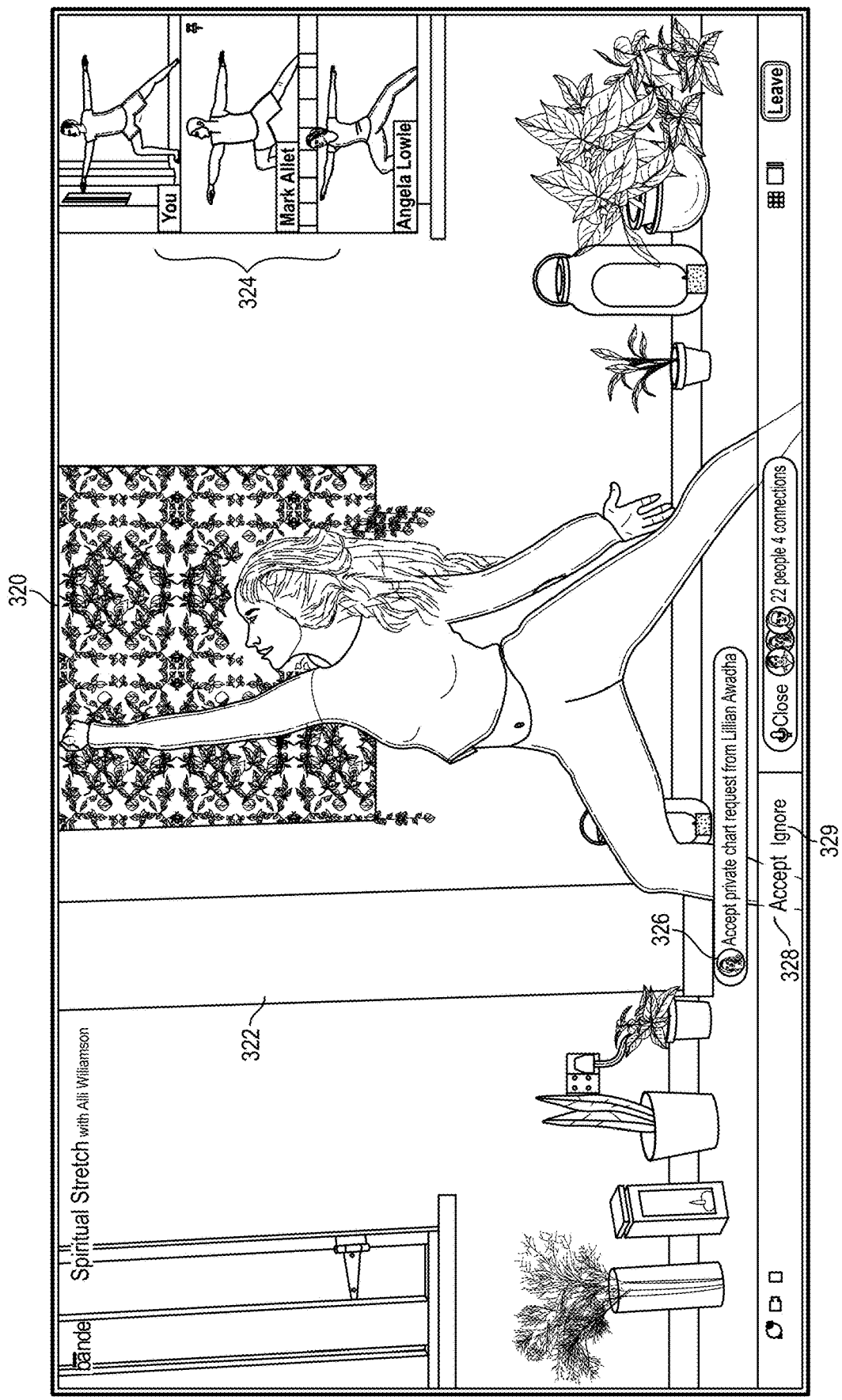
FIG. 3B is an example user interface presented by a participant device to accept a request to join a side-channel communication group in accordance with the techniques described herein.
Figure 3C:
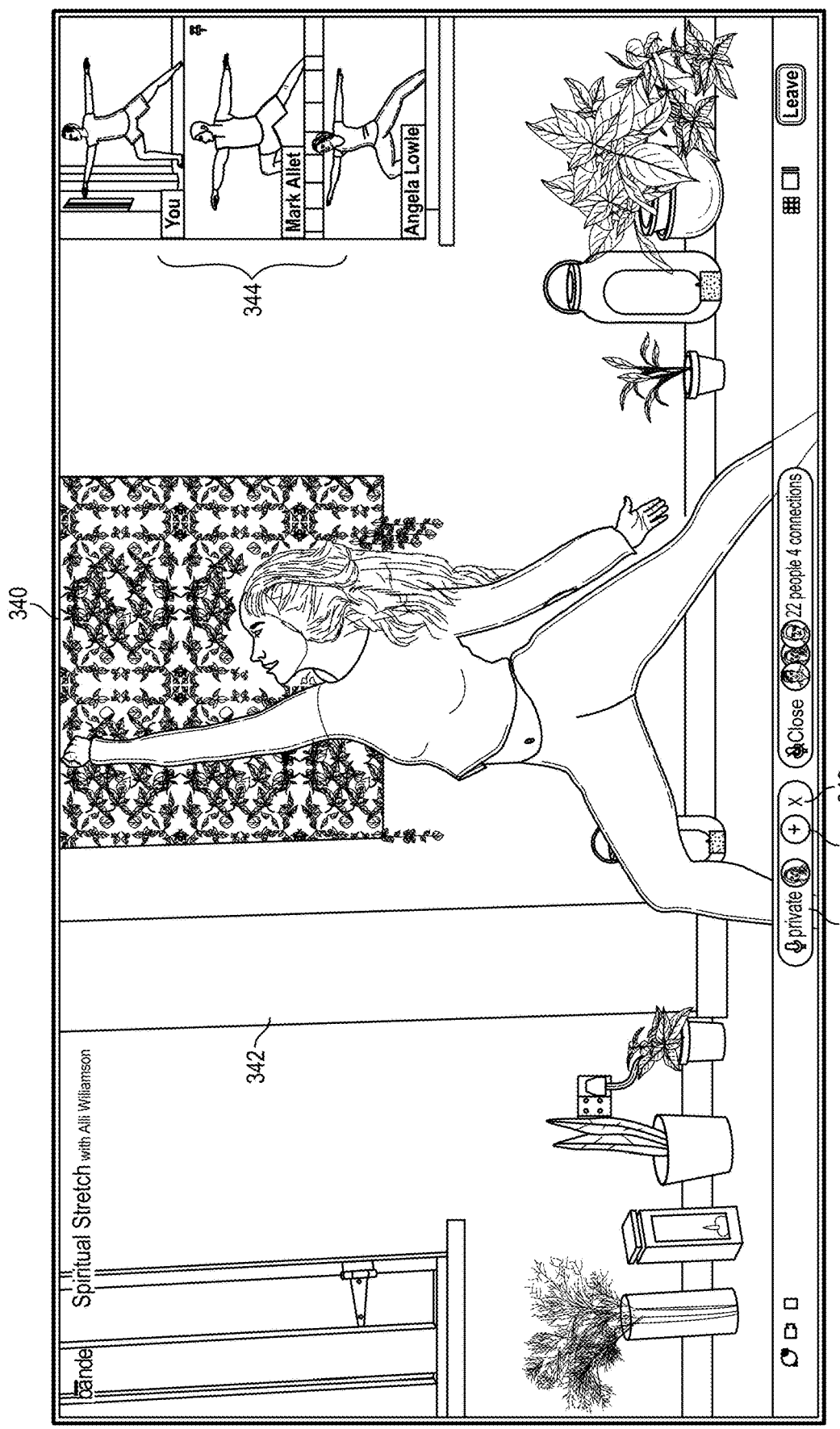
FIG. 3C is an example user interface presented by a participant device while within a side-channel communication group in accordance with the techniques described herein.

Turning now to FIG. 3A-3C, illustrated are example user interfaces displayed by a participant device 105 as part of viewing content presented to a shared communication channel (such as the shared communication channel 170 of FIG. 2) supported by the host platform 115. More particularly, the user interfaces may be presented by the browser 142 or the dedicated application 143 executing on the participant device 105. It should be appreciated that the participant device 105 may only be configured to display these user interfaces if the dedicated application 143 determines that the user profile corresponding to the participant device 105 has sufficient permissions to join a side-channel communication group.

Starting with FIG. 3A, illustrated is an example user interface 300 presented by the participant device 105 to facilitate generating a request to form of a side-channel communication group with another participant of the shared communication channel. The user interface 300 includes a first display area 302 for displaying video streams presented to the shared communication channel by the host device 113 and a second display area 304 for displaying video streams presented to the shared communication channel by other participant devices 105 that have joined the shared communication channel. As illustrated, the second display area 304 may be overlaid on top of the first display area 302.

As described herein, the participant corresponding to the user interface 300 may be associated with a user profile maintained at the user database 130 that indicates a plurality of connected users. Accordingly, the hosting service 121 may transmit to the participant device 105 a list of connected users have joined the shared communication channel. In response, the dedicated application 143 may be configured to prioritize the video streams received from the participant device 105 corresponding to the connected users in the second display area 304. For example, the dedicated application may pin those video streams to the second display area 304.

As illustrated, the user interface 300 also includes a selection interface 306 that enables the user to generate a selection of users from the received list of connected users. The selection interface 306 may enable the user of the participant device 105 to select any number of the listed connected users. While FIG. 3A illustrates a selection interface where the user selects the connected user by interacting with the indication of connected user itself, alternate user interface means of generating a selection are envisioned (e.g., radio selection buttons, checkboxes, etc.). In embodiments where access to side-channel communication groups is restricted to only certain participants, the list of connected users received by the participant device 105 may include an indication of whether or not each connected user is permitted to join side-channel communication groups. Accordingly, the selection interface 306 may distinguish between connected users that are permitted to join side-channel communication groups and those that are not. For example, the selection interface 306 may grey-out or otherwise disable the selection of connected users that are not permitted to join side-channel communication groups.

The user interface 300 also includes a selection confirmation element 308. When the user interacts with the selection confirmation element 308, the dedicated application 143 may be configured to generate a request to invite the users selected via the selection interface 306. More particularly, the dedicated application 143 may cause the participant device 105 to transmit the request to the host platform 115 to route the request to the corresponding participant devices 105 of the selected users.

Turning to FIG. 3B, illustrated is an example user interface 320 displayed by the participant device 105 to facilitate accepting a request to join a side-channel communication group. More particularly, the participant device 105 may be configured to display the user interface 320 in response to receiving a request to join the side-channel communication group from the host platform 115. The user interface 320 includes a first display area 322 for displaying video streams presented to the shared communication channel by the host device 113 and a second display area 324 for displaying video streams presented to the shared communication channel by other participant devices 105 that have joined the shared communication channel. It should be appreciated that the first and second display areas 322 and 324 may be generated in a similar manner as described with respect to the first and second display areas 302 and 304 of FIG. 3A.

As illustrated, the user interface 320 includes a notification element 326 that informs the user that the request to join a side-channel communication group was received by the participant device 105. The notification element 326 may indicate the particular connected user that generated the request based upon an indication of the particular connected user included in the request.

The user interface 320 also includes an acceptance element 328 and rejection element 329 that enables the user to accept or reject the request, respectively. In response to detecting a user interaction with the rejection element 329, the participant device 105 may be configured to transmit a rejection notification to the host platform 115 or simply cause the participant device 105 to stop displaying elements 326, 328, and 329 thereby letting the request time out. On the other hand, in response to detecting a user interaction with the acceptance element 328, the participant device 105 may be configured to transmit an acceptance notification to the host platform 115. In response to receiving the acceptance notification, the host platform 115 may cause the participant device 105 to join the side-channel communication group the requestor is currently a member of or establish a new side-channel communication group with the requestor.

FIG. 3C illustrates an example user interface 340 presented by the participant device 105 while within a side-channel communication group (such as the side-channel communication group 180 of FIG. 2). The user interface 340 includes a first display area 342 for displaying video streams presented to the shared communication channel by the host device 113 and a second display area 344 for displaying video streams presented to the shared communication channel by other participant devices 105 that have joined the shared communication channel. If there are more connected users in the shared communication channel than available for display in the second display area 344, the participant device 105 may prioritize the display of the connected users that are members of the side-channel communication group in the second display area 344. Otherwise, the first and second display areas 342 and 344 may be generated in a similar manner as described with respect to the first and second display areas 302 and 304 of FIG. 3A.

The user interface 340 includes user side-channel communication group panel element 346 that includes an indication of other members of the side-channel communication group. The panel element 346 includes an element 347 that enables the participant device 105 to generate a request that another connected user joins the side-channel communication group. For example, in response to interacting with the element 347, the participant device 105 may present the selection element 306 and selection confirmation element 308 of the user interface 300. Additionally, the panel element 346 includes an element 348 that enables the user to leave the side-channel communication group. Accordingly, in response to detecting a user interaction with the element 348, the participant device 105 may transmit a notification to the host platform 115 that causes the host device 115 to remove the participant device 105 from the side-channel communication group.

Additional or alternative user interfaces may provide similar capabilities to that shown in FIGS. 3A-3C and/or may provide additional capabilities described herein. Furthermore, user interface techniques may be implemented that use audio input/output via a microphone and/or speaker of the participant device 105, in various embodiments, to communicate via audio channels (e.g., voice commands).

Figure 4:
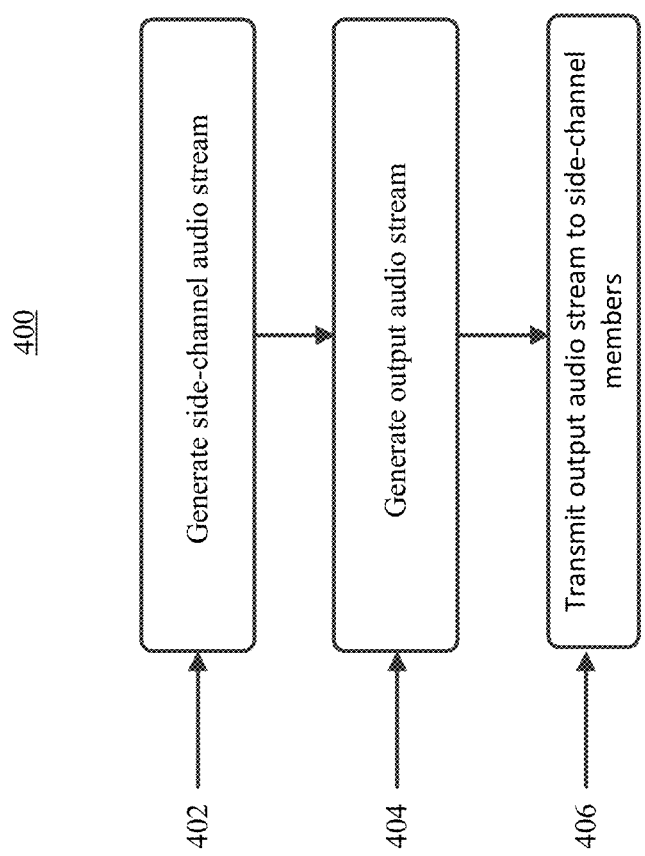
FIG. 4 is an example flow diagram for mixing audio for a side-channel communication group with audio of a shared communication channel via the host platform of FIGS. 1-2.

FIG. 4 is an example flow diagram of an example method 400 for mixing audio for a side-channel communication group (e.g. the side-channel communication group 180 of FIG. 2) with audio of a shared communication channel (e.g. the shared communication channel 170 of FIG. 2). A host platform (e.g., the host platform 115 of FIGS. 1-2) and/or applications executing thereon (e.g., the hosting service 121 and/or the audio mixer 122 of FIG. 1A) may be configured to perform the steps of the method 400. More particularly, the host platform 115 may perform the steps of the method 400 when one or more side-channel communication groups have been established as part of a shared communication channel. Accordingly, the host platform may store a data record corresponding to the shared communication channel that includes an indication of the side-channel communication group and an indication of the members thereof.

The method 400 begins when the host platform generates, for a member of the side-channel communication group, a side-channel audio stream by combining the audio streams received from the other members of the side-channel communication group (block 402). For example, the host platform may combine the audio streams using an audio mixer. Accordingly, the host platform may generate a different side-channel audio stream for each member of the side-channel communication group.

At block 404, the host platform generates an output audio stream by combining the side-channel audio stream with the audio stream from the host audio source. For example, the host platform may use the audio mixer to combine the side-channel audio stream and the host audio stream. To prioritize audio from presented by the host device to the shared communication channel, the host platform may mix the side-channel audio stream with the audio stream from the host audio source such that a volume level of the side-channel audio stream is less than a volume level of the audio stream from the host audio source.

As another example, the host platform may dynamically mix the host audio stream and the side-channel audio stream. For example, the host platform may be configured to determine that a magnitude of the host audio stream is below a first threshold magnitude and increase the volume level of the side-channel audio stream within the output audio stream. Subsequently, the host platform may determine that the magnitude of the host audio stream is above a second threshold magnitude, and decrease the volume level of the side-channel audio stream within the output audio stream.

To smooth out the volume levels, the host platform may implement hysteresis techniques. As one example, the second threshold may be a higher magnitude than the first magnitude. As another example, the host platform may determine that the magnitude of the host audio stream is below the first threshold magnitude for a threshold duration before adjusting the volume level of the side-channel audio stream. The threshold duration may vary depending on the type of shared communication channel. For example, the host platform may categorize the contents channel types and assign a threshold duration to each category.

At block 406, the host platform transmits, to the member of the side-channel communication group, the output audio stream. The host platform may be configured to obtain a network address corresponding to the member's participant device from a record associated with the shared communication channel and/or side-channel communication group.

As described herein, the host platform may enable the host device to enable and/or disable side-channel communication groups. Accordingly, the host platform may be configured to obtain an indication that side-channel communications are disabled. In response, the host platform may route audio to the participant devices of members of the side-channel communication group in a similar manner as participant devices of the shared communication channel that are not members of a side-channel communication group. That is, the host platform may be configured to transmit a participant audio stream to each participant device of the shared communication channel when side-channel communications are disabled. The participant audio stream may be an audio stream formed by mixing the audio streams received from the host device and each other participant device in the shared communication channel.

In some embodiments, the host platform is configured to receive, via the one or more transceivers, an indication that a particular participant device is to be added to the side-channel communication group. For example, the indication may be received in response to a user interacting with the acceptance element 328 of FIG. 3B. The host platform may then modify the indication of the participant devices included in the side-channel communication group to include an indication of the particular participant device. In embodiments where access to the side-channel communication groups are restricted to users having sufficient permission, the host platform may query the permissions included in the user profile corresponding to particular participant device to ensure the particular participant device has sufficient permissions before modifying the indication of the side-channel communication group.

Figure 5:
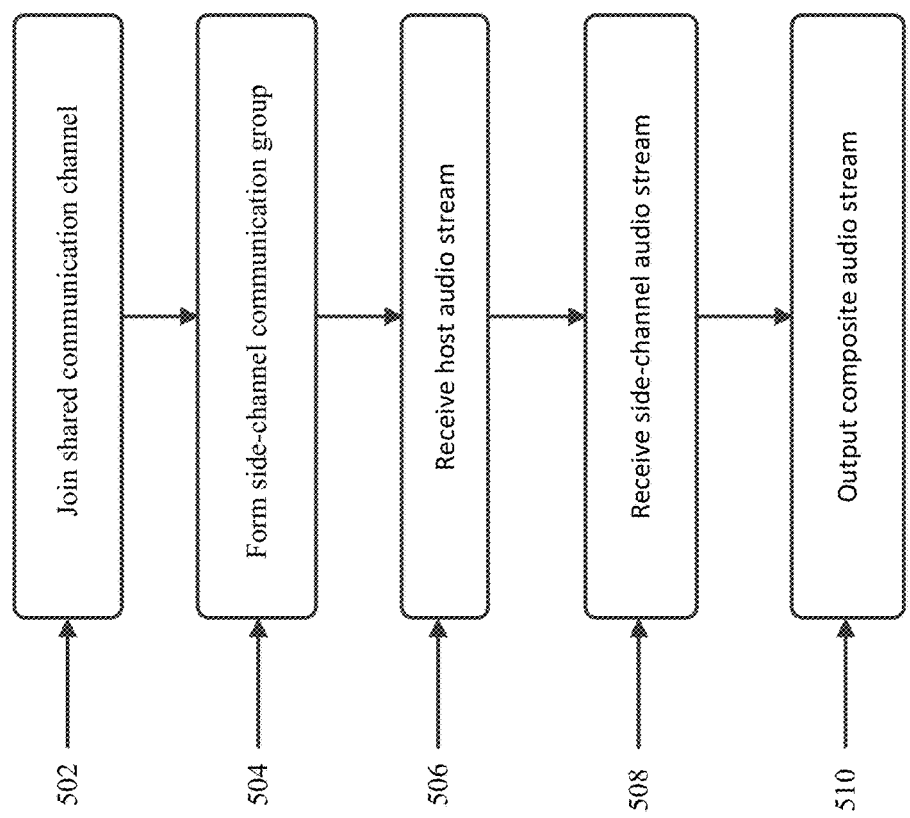
FIG. 5 is an example flow diagram for mixing audio for a side-channel communication group with audio of a shared communication channel via a participant device of FIGS. 1-2.

FIG. 5 is an example flow diagram for an example method 500 for mixing audio of a side-channel communication group with audio of a shared communication channel. The method 500 may be performed by a participant device (e.g., the participant device 105 of FIGS. 1-2). More particularly, the method 500 may be performed by an application executing on the participant device (e.g., the dedicated application 143 of FIG. 1B).

The method 500 begins when the participant device joins the shared communication channel (block 502). For example, the user may interact with the dedicated application to join a class hosted by a server, such as the host platform 115 of FIGS. 1-2.

At block 504, the participant device forms a side-channel communication group with at least one other participant device of the shared communication channel. For example, the participant device may receive a request to join a side-channel communication group from another participant. Accordingly, the participant device may form the side-channel communication group by transmitting an acceptance notification to the server (e.g., in response to detecting an interaction with the acceptance element 328). As another example, the participant device may form the side-channel communication group by transmitting a request for another participant device to join the side-channel communication group (e.g., by detecting an interaction with the selection confirmation element 308 of FIG. 3A). In response to the other participant device joining the side-channel communication group, the participant device may receive an acknowledgement from the server that the other participant agreed to join the side-channel communication group.

At block 506, the participant device receives, from the server, a host audio stream generated by a host device of the shared communication channel. At block 508, the participant device receives, from the server, a side-channel audio stream that includes audio data generated by the at least one other participant device included in the formed side-channel communication group. For example, the host audio stream may be the audio stream from the shared communication channel 170 of FIG. 2 and the side-channel audio stream may be the audio stream from the side-channel communication group 180 of FIG. 2.

In some embodiments, the host audio stream and the side-channel audio stream are received as part of a composite audio stream from the server. In these embodiments, the participant device may be able to adjust parameters, such as a volume level, associated with the component audio streams of the composite audio stream. In other embodiments, the host audio stream and the side-channel audio stream are received as separate audio streams.

At block 508, the participant device outputs a composite audio stream formed from the host audio stream and the side-channel audio stream. In embodiments where the server mixed the composite audio stream, such as by following the techniques corresponding to the method 400, the participant device may route the received audio to an audio output of the participant device. In other embodiments, the participant device may be configured to mix the host audio stream and the side-channel audio stream together. For example, the dedicated application may include an audio mixer capable of mixing the audio streams in accordance with the techniques described herein.

For example, to prioritize audio from presented by the host device to the shared communication channel, the participant device may mix the side-channel audio stream with the host audio stream such that a volume level of the side-channel audio stream is less than a volume level of the host audio stream. As another example, the participant device may dynamically mix the host audio stream and the side-channel audio stream. For example, the participant device may be configured to determine that a magnitude of the host audio stream is below a first threshold magnitude and increase the volume level of the side-channel audio stream within the composite audio stream. Subsequently, the host platform may determine that the magnitude of the host audio stream is above a second threshold magnitude, and decrease the volume level of the side-channel audio stream within the composite audio stream.

To smooth out the volume levels, the participant device may implement hysteresis techniques. As one example, the second threshold may be a higher magnitude than the first magnitude. As another example, the participant device may determine that the magnitude of the host audio stream is below the first threshold magnitude for a threshold duration before adjusting the volume level of the side-channel audio stream. The threshold duration may vary depending on the type of shared communication channel. For example, the server may categorize the contents channel types and assign a threshold duration to each category. The participant device may then utilize the channel type identifier to apply the appropriate threshold duration.

The participant device may also be configured to receive, from a server (e.g. the music server 114 of FIGS. 1A-1B), a music audio stream associated with the shared communication channel. It should be appreciated that the server from which the music stream is received may be a different server than the server that hosts the shared communication channel. Accordingly, the participant device may be configured to mix the music audio stream, the host audio stream and the side-channel audio stream to produce the composite audio stream.

In some embodiments, the participant device may be configured to output the composite audio stream by routing the composite audio streams to respective audio output devices. For example, the participant device may include an internal audio output device (e.g., the audio output 145 of FIG. 1B) and be operatively coupled to one or more external audio output devices (e.g., the audio output device 108 of FIG. 1B). Accordingly, the participant device may be configured to route the host audio stream to the internal audio output device and the side-channel audio stream to the external audio output device, or vice versa. As another example, the participant device may be configured to route the host audio stream and the side-channel audio stream to the internal audio output device and the music audio stream to the external audio output device.

ADDITIONAL CONSIDERATIONS

All of the foregoing computer systems may include additional, less, or alternate functionality, including that discussed herein. All of the computer-implemented methods may include additional, less, or alternate actions, including those discussed herein, and may be implemented via one or more local or remote processors and/or transceivers, and/or via computer-executable instructions stored on computer-readable media or medium.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, a fitness studio environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

What is claimed is:

1. A system for providing side-channel communications to supplement a shared communication channel, the system comprising:
   one or more processors;
   one or more transceivers configured to receive a plurality of audio streams from a plurality of audio sources, wherein the plurality of audio sources include a host audio source and a plurality of participant audio sources corresponding to a plurality of participant devices; and
   one or more non-transitory memories configured to store
   (i) an indication that two or more participant devices of the plurality of participant devices are members of a side-channel communication group, and (ii) computer executable instructions that, when executed via the one or more processors, cause the system to:
for each participant device that is a member of the side-channel communication group:
generate a side-channel audio stream by combining the audio streams received from other members of the side-channel communication group,
generate an output audio stream by combining the side-channel audio stream with the audio stream from the host audio source, and
transmit, to the participant device of the member of the side-channel communication group and via the one or more transceivers, the output audio stream;
for participant devices that are not members of the side-channel communication group, transmit, to the participant device and via the one or more transceivers, the host audio stream;
determine that a magnitude of the audio stream from the host audio source is below a first threshold magnitude; and
in response to the determination, increase the volume level of the side-channel audio stream within the output audio stream.

2. The system of claim 1, wherein to determine that the magnitude of the audio stream from the host audio source is below the first threshold magnitude, the instructions, when executed, cause the system to:
determine that the magnitude of the audio stream from the host audio source is below the first threshold magnitude for a threshold duration.

3. The system of claim 2, wherein:
the shared communication channel is associated with an indication of a communication channel type; and
the threshold duration varies depending upon the communication channel type.

4. The system of claim 1, wherein the instructions, when executed, cause the system to:
subsequent to increasing the volume level of the side-channel audio stream, determine that the magnitude of the audio stream from the host audio source is above a second threshold magnitude; and
decrease the volume level of the side-channel audio stream within the output audio stream.

5. The system of claim 1, wherein to generate the output audio stream, the instructions, when executed, cause the system to:
mix the side-channel audio stream with the audio stream from the host audio source such that a volume level of the side-channel audio stream is less than a volume level of the audio stream from the host audio source.

6. The system of claim 1, wherein the instructions, when executed further cause the system to:
obtain an indication that side-channel communications are disabled; and
responsive to the indication, transmit a participant audio stream to the plurality of participant devices.

7. The system of claim 1, wherein the instructions, when executed further cause the system to:
receive, via the one or more transceivers, an indication that a particular participant device is to be added to the side-channel communication group; and
modify the indication that the two or more participant devices of the plurality of participant devices correspond to participant devices that are members of the side-channel communication group to include an indication of the particular participant device.

8. The system of claim 1, further comprising:
a user database configured to store a plurality of user profiles respectively associated with a plurality of users, wherein user profiles included in the plurality of user profiles include a set of connected users associated with the user corresponding to the user profile.

9. The system of claim 8, wherein:
user profiles included in the plurality of user profiles include an indication of a permission level associated with joining side-channel communication groups, and
wherein the instructions, when executed further cause the system to:
receive, via the one or more transceivers, an indication that a particular participant device is to be added to the side-channel communication group;
determine that a user profile corresponding to the particular participant device includes a permission level that permits the particular participant device to join side-channel communications; and
in response to the determination, modify the indication that the two or more participant devices of the plurality of participant devices correspond to participant devices that are members of the side-channel communication group to include an indication of the particular participant device.

10. A method for participating in side-channel communications to supplement a shared communication channel, the method comprising:
joining, by one or more processors, the shared communication channel;
forming, by the one or more processors, a side-channel communication group with at least one other participant device of the shared communication channel;
receiving, from a server, a host audio stream generated by a host device of the shared communication channel;
receiving, from the server, a side-channel audio stream that includes audio data generated by the at least one other participant device included in the formed side-channel communication group;
outputting, by the one or more processors, a composite audio stream formed from the host audio stream and the side-channel audio stream;
mixing, by the one or more processors, the host audio stream and the side-channel audio stream to produce the composite audio stream;
determining, by the one or more processors, that a magnitude of the host audio stream is below a first threshold magnitude; and
in response to the determination, increasing, by the one or more processors, the volume level of the side-channel audio stream within the output audio stream.

11. The method of claim 10, wherein receiving the host audio stream and the side-channel audio stream comprises:
receiving, from the server, the composite audio stream.

12. The method of claim 10, wherein producing the composite audio stream comprises:
subsequent to increasing the volume level of the side-channel audio stream, determining, by the one or more processors, that the magnitude of the host audio stream is above a second threshold magnitude; and
decreasing, by the one or more processors, the volume level of the side-channel audio stream within the output audio stream.

13. The method of claim 10, wherein outputting the composite audio stream comprises:
routing, by the one or more processors, the host audio stream to a first output device; and routing, by the one or more processors, the side-channel audio stream to a second output device.

14. The method of claim 10, wherein forming the side-channel communication group comprises:
   determining, by one or more processors, that one or more participant devices in the shared communication channel correspond to connected users; and
   presenting, by one or more processors, a user interface configured to present a user interface element to initiate a request for the one or more connected users join the side-channel communication group.

15. The method of claim 10, wherein forming the side-channel communication group comprises:
   receiving, from the server, a request to join the side-channel communication group;
   presenting, by one or more processors, a user interface configured to enable a user to accept the request; and
   transmitting, to the server, an acceptance of the request.

16. The method of claim 10, wherein outputting the composite audio stream comprises:
   receiving, from a server, a music audio stream associated with the shared communication channel; and
   mixing, by the one or more processors, the music audio stream, the host audio stream and the side-channel audio stream to produce the composite audio stream.

17. A non-transitory computer readable medium storing computer-executable instructions that, when executed by one or more processors, cause the one or more processors to:
   join a shared communication channel;
   form a side-channel communication group with at least one other participant device of the shared communication channel;
   receive, from a server, a host audio stream generated by a host device of the shared communication channel;
   receive, from the server, a side-channel audio stream that includes audio data generated by the at least one other participant device included in the formed side-channel communication group;
   output a composite audio stream formed from the host audio stream and the side-channel audio stream;
   determine that a magnitude of the host audio stream is below a first threshold magnitude; and
   in response to the determination, increase the volume level of the side-channel audio stream within the output audio stream.

* * * * *